June 5, 1962 A. L. DE GRAFFENRIED 3,038,097
INDICATING MEANS
Filed April 22, 1960

INVENTOR
ALBERT de GRAFFENRIED
BY
Leonard H. King

United States Patent Office 3,038,097
Patented June 5, 1962

3,038,097
INDICATING MEANS
Albert L. de Graffenried, Roslyn Harbor, N.Y., assignor to Avien, Inc., Woodside, N.Y.
Filed Apr. 22, 1960, Ser. No. 24,030
11 Claims. (Cl. 313—108)

This invention relates to an electro-luminescent magnitude indicator.

With the increased use of automation it is becoming more and more important to provide for faster, easier, and more reliable means for communicating information from machines to people. As is disclosed hereinafter, there is provided an easily read indicator which is visible under daylight or night operating conditions.

When certain materials, i.e., phosphors, are placed in a fluctuating electric field, under proper conditions, they are excited to luminescence and continue to emit light as long as the exciting field is maintained. This constitutes the phenomenon of electroluminescence. This phenomenon has been put to practical use in the form of the electro-luminescent lamp which comprises essentially a phosphor placed between two electric conductors across which a suitable voltage may be applied, due provisions being made for transmission of the light emmitted by the phosphor. In the electro-luminescent lamp structure disclosed in U.S. Patent 2,566,349, for example, a layer of a field-responsive phosphor in a light-transmitting dielectric material is disposed between a light-transmitting electrically-conductive layer and an electrically-conductive layer which may, but need not be, light-transmitting. The two electrically-conductive layers are connected to a source of alternating or pulsating current of the desired potential which serves to excite the phosphor material to luminescence. The electro-luminescent lamp differs from the fluorescent lamp in that in the latter, the voltage or field is placed across a gas and the radiation from the gas is used to excite a phosphor; whereas, in the electroluminescent lamp, light is obtained by the direct application of a varying voltage across a phosphor or by placing the phosphor in a varying electric field.

Briefly stated, this invention relates to a thermometer-type indicator which uses a moving vertical column of an electrically conductive liquid as the one electrode of an electro-luminescent strip. The front electrode is a transparent electrically-conductive film supported on a transparent member. Interposed between the conductive liquid and the transparent conductive film there is provided an electrically non-conductive layer of material containing a phosphor which glows when subjected to an alternating electrostatic field. A suitable voltage is applied between the transparent front electrode and the rear conducting fluid electrode so as to excite the phosphor only in the vicinity of the conductive liquid. As the column of liquid is forced upward in the channel, the amount of phosphor strip energized increases, providing a visual indication of the magnitude of a sensed condition.

In a preferred embodiment of this invention, a vertical strip of resistance material is deposited on the rear inside surface of the liquid channel. As the column of liquid moves upward, in the channel, more and more of the resistive strip is shorted out. This mechanism provides means to sense the height of the liquid column and provide a proportional electrical feedback signal which is fed back into the system to correct for errors in the system.

It should be appreciated that the feedback provision of this invention is extremely important in such applications as in aircraft use, where, assuming that the craft has experienced a sudden updraft, which would result in a downward acceleration for the indicator, one would ordinarily expect the column of fluid to be depressed. However, with a closed loop system, using this resistance strip sensor a large portion of this depression would be wiped out due to the inherent characteristic of providing negative feedback.

Another advantage of the feedback arrangement is that it compensates for the expansion of liquid with temperature.

One feature of this invention is the provision of a system containing a minimum of mechanical moving parts.

Another feature of this invention is an indicator including a position sensing transducer whereby the position of the indicating point may be converted into an electrical signal.

Another feature of this invention is the provision of a self-compensating indicator.

A particular feature of this invention is to provide a column type indicator capable of continuously exhibiting the change of a gradually changing sensed condition.

Still other objects and advantages of this invention will in part be pointed out, and will in part become obvious, as the following description proceeds, taken in conjunction with the accompanying drawings.

In the drawings.

In the various figures, like reference numerals are employed to designate like elements.

Figure 1:
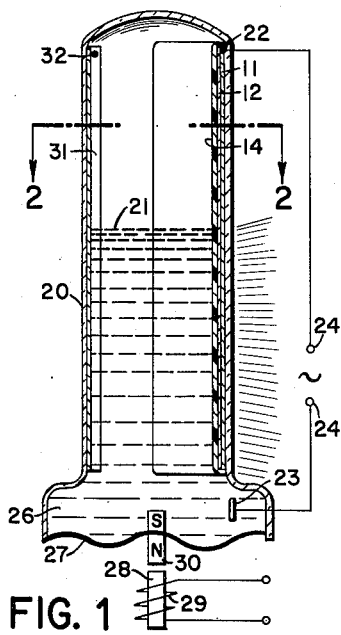
FIG. 1 shows schematically an indicator and associated electrical circuits.
Figure 2:
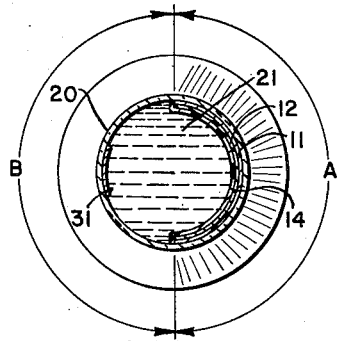
FIG. 2 is a section of the indicator taken along line 2—2 of FIG. 1.

In FIGS. 1 and 2 there is shown a transparent glass tube 20 which carries a transparent conductive coating 11 over which there is a coating 12 of phosphor particles imbedded in a dielectric material. A thin coating 14 of an acrylic resin serves as a sealer for coating 12. Other suitable insulators may be employed as the sealer layer 14.

The transparent conductive coating can be of stannous chloride applied as taught in U.S. Patent No. 2,624,857 although other transparent coatings can be used. Metals such as aluminum, zinc, silver, etc., may be readily applied to one side of the glass by evaporation at high vacuum according to techniques well known in the art, to form thereon continuous metal coatings which though electrically conductive, may be so thin, e.g., in the neighborhood of 0.0001", as not to substantially impair the light transmitting properties of the glass. While glass plate is described herein as a suitable material, it is to be understood that plastic materials may be employed as the supporting structure in place of the glass. Such a construction is taught, for example, in U.S. Patent No. 2,733,367. While it is common practice to employ glass-like or vitreous phosphor layers in the electro-luminescent lamp art, one may employ for the purpose of this invention, plastic resin compositions for the phosphor layer. Such compositions are taught, for example, in U.S. Patent No. 2,733,367, and U.S. Patent No. 2,728,870.

The reason for the coating 14 is that in the practice of the invention disclosed herein a liquid conductor is employed as a moving electrode. In general, vitreous-type phosphor layers are porous and would absorb the liquid. Accordingly, and in particular, if a vitreous-type layer is employed, it is necessary to further coat the layer with a material impervious to the liquid. Even when employing a synthetic resin base phosphor layer it is preferred that the layer of sealer be employed, as the synthetic resin composition layer may be rendered porous by the particles of phosphor or normal porosity of the material. Tube 20 is filled with a conductive liquid 21. Electrode 22 provides means to connect a source of alternating current to conductive coat 11, and electrode 23 provides means for making connection to liquid 21. The electrodes are connected to a source of alternating current 24. Liquid 21 serves as the second electrode of the electroluminescent system. Phosphor layer 12 will glow only in that region sandwiched between liquid 21 and electrode 11. Thus a viewer will be provided with a visual indication of the height of the liquid level.

A portion of the liquid is confined in a chamber 26. The chamber 26 is fitted with a diaphragm 27 which may be actuated by means of magnetic armature 30. In association with the armature 30 there is provided an electromagnet including winding 29 and ferromagnetic core 28. As will be explained hereinafter in detail, the signal whose amplitude is to be displayed, is combined with a correction signal and the combined signal, after amplification, is fed to an amplifier whose output circuit is connected to coil 29. The pressure exerted on the diaphragm will be related to the amplitude of the signal applied to the coil but is not necessarily proportional to the command signal whose amplitude is to be displayed.

The tube 20 is provided with a resistance coating 31 which extends vertically in spaced relation to coating 11. As the liquid level increases a greater amount of the coating 31 is in contact with the liquid. Accordingly, the resistance will decrease between electrode 23 and electrode 32 connected to strip 31.

Figure 3:
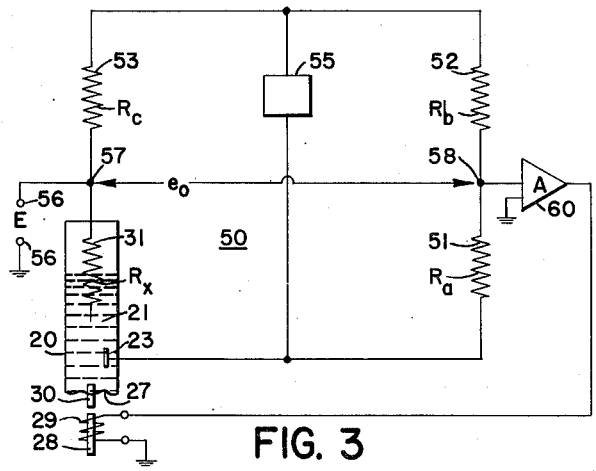
FIG. 3 is a schematic representation of a circuit of this invention.

Referring now to FIG. 3, there is shown a schematic diagram of a circuit which includes the apparatus of FIG. 2. In this circuit the resistance coating 31, in combination with liquid 21, serves as a variable resistor forming arm $R_x$ of bridge 50. Fixed resistors 51, 52, and 53 form arms $R_a$, $R_b$, and $R_c$, respectively. A source of constant potential 55 is connected across one diagonal of the bridge. A signal, whose magnitude is to be indicated, is applied to terminals 56, one terminal being connected to a terminal 57 of the output diagonal of the bridge, the other output terminal 58 of the bridge is connected to the input terminal amplifier 60. Thus it will be appreciated that there is applied to amplifier 60 a potential which is the sum of the condition being sensed and the output signal of bridge 50. The output of amplifier 60 is fed to winding 29. Amplifier 60 should be a high input impedance amplifier of relatively high gain, say a gain of at least 1000. Upon application of a signal to terminals 56, amplifier 60 will cause armature 30 to move bellows 27 forcing liquid 21 up tube 20.

Resistance member 31 is so designed that when the liquid column height is zero, the sensing resistance is $R_x$ and is equal to $R_a$, the ohmic value of fixed resistor 51. Resistors 52 and 53 are chosen so that $R_b$ is equal to $R_c$. Therefore, for this case, $e_o$ is equal to zero, where $e_o$ is the error signal produced by the bridge.

As column height increases above zero, $R_x$ decreases toward zero. This unbalances the bridge proportional to the change in $R_x$.

The bridge output, $e_o$, is then fed to the amplifier 60 as it is in series with the input signal voltage E. The error signal is phased opposite the signal E, whose magnitude is to be indicated. The signal applied to amplifier 60 is $(E-e_o)$.

It should be appreciated that the ohmic ratio of the arms may be varied to provide, in essence, a computer.

Amplifier 60 amplifies the signal, and provides a proportional D.C. signal to coil 29 which actuates permanent magnet 30 in diaphragm 27. If the input signal, E, increases, additional conductive liquid is forced further up into tube 20, thus shorting out more of $R_x$ until $e_o$ is essentially nulling out E.

This means that the vertical height of the liquid column is proportional to the input signal voltage E.

Figure 4:
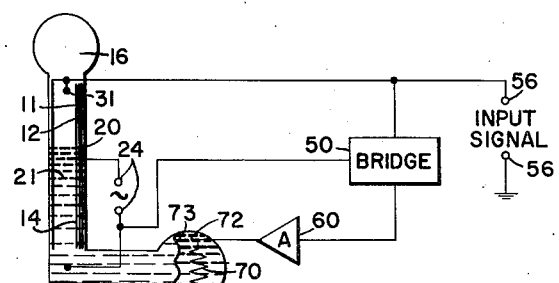
FIG. 4 shows schematically an alternate embodiment of this invention.

FIG. 4 shows a heater 70 driven by amplifier 69 which causes captive fluid 72 to expand and resultant pressures transferred across the diaphragm 73 to the conductive working fluid 21 which rises up column 20.

Reservoir 16 may be filled with gas under pressure to provide a damping effect.

It is also within the scope of this invention to float a marker on the conductive liquid or to provide a second, non-miscible electrically non-conductive liquid on top of conductive liquid 21. A suitable reservoir would have to be provided.

Figure 5:
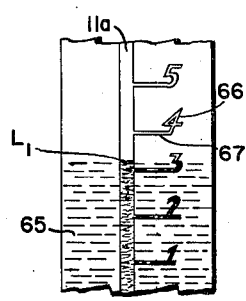
FIG. 5 shows pictorially a digital type display.

If a digital type indication is desired then instead of a continuous metal coating 11, a ribbed pattern 11a, such as shown in FIG. 5, may be employed. As the liquid column rises, both an analogue and digital display will be provided. Liquid 65 is shown at level $L_1$. It will be noted that those of numerals 66 which are below the level of the liquid are illuminated (as indicated by the shading of the drawing). Those of indicia 67 below the level of the liquid 65 are likewise illuminated.

Referring to FIG. 2, there is shown an embodiment of this invention which permits the use of the indicator under both day and night conditions. Portion A is coated with an electroluminescent material. Portion B is left clear. Accordingly, an observer will see the column of liquid through the clear portion during the day, and will observe the luminescent portion during night conditions. The liquid may be colored, say red, to provide ready visibility.

The vertical strip 31 of resistance material may be conductive carbon impregnated resin coating, such as used for printed circuits, or a conductive metal strip such as a layer of silver, or even a fine wire. If the liquid is highly conductive, say mercury, then the resistance type coating will be necessary.

Figure 6:
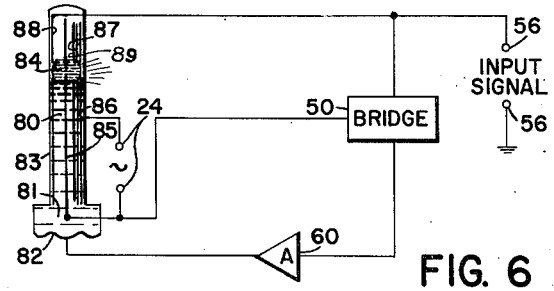
FIG. 6 shows schematically a modified display which employs a moving bubble of liquid.

FIG. 6 shows an alternative embodiment of this invention, wherein an electrically non-conductive liquid 80 occupies reservoir 81 which is fitted with a diaphragm 82. In tube 83 there is floated a small amount of an electrically conductive liquid 84 having a density less than that of electrically non-conductive liquid 80. An electrically conductive strip 85 of low resistivity, such as silver or other metal, extends the length of the tube. A vertical strip of a transparent electrically conductive material 86, coated with a layer of phosphor 87, and an insulator coating 89, extend parallel to strip 85. A resistance element 88 extends the length of the tube in spaced relationship to strips 85 and 86. As an input signal is applied to terminals 56 the signal is transmitted through the bridge 50 to amplifier 60, which actuates diaphragm 82 forcing liquid 80 to move bubble 84 along the tube which, as will be readily appreciated, will produce a moving glow region indicative of the input signal. It is to be noted that the negative feedback feature of the prior embodiment has been retained.

Figure 7:
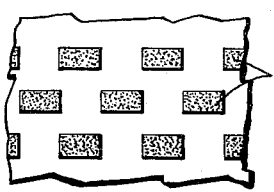
FIG. 7 is an enlarged showing of a portion of a coated transparent support member.

In lieu of the side-by-side clear and phosphor composition coated sections of the tube shown in FIG. 1, the phosphor composition may be applied by silk screening or other method in a dot-like pattern so as to provide a transparent background. This embodiment is shown in FIG. 7. The advantage of this arrangement is that it provides a day and night viewing area of maximum dimension.

The liquid may be mercury, an aqueous salt solution, or may be an inherently conductive organic liquid. The organic liquid may have ionizable salts dissolved therein to increase conductivity.

The physical configuration of the tube, the actuating means and diaphragm can be varied to meet the requirements of a particular installation.

While the device has been described as embodied in a vertical column it is to be understood that the column may be angularly deployed and may even be in the form of an are without departure from the spirit of the invention.

What is claimed is:

1. An electroluminescent indicator comprising a hollow tubular member provided with a transparent wall; a transparent electrically conductive coating supported by said wall; a layer of electroluminescent phosphor particles affixed to said conductive layer; electrical insulating means coating said electroluminescent phosphor particles; electrically conductive liquid positioned in said tubular member; means for varying the level of said liquid in said tubular member in response to an external signal; and means to apply a voltage between said transparent electrically conductive coating and said electrically conductive liquid for exciting said phosphor particles.

2. The apparatus of claim 1 wherein said means for varying the level of said liquid includes a diaphragm.

3. The apparatus of claim 2 wherein said means for varying the level of said liquid includes an electromagnetically actuated armature coupled to said diaphragm.

4. The apparatus of claim 1 wherein said means for varying the level of said conductive liquid comprises a confined liquid; a flexible diaphragm interposed between said confined liquid and said conductive liquid and means to heat said confined liquid in response to a control signal so as to cause said confined liquid to expand and contract in response to variations in amplitude of said control signal.

5. An electroluminescent lamp comprising a transparent tubular member; a layer of electrically conductive transparent material coated along a portion of the interior wall of said tubular member; a layer of electroluminescent phosphor particles bounded to said electrically conductive transparent layer, said phosphor particles being arranged in a pattern so as to provide regions of said electrically conductive layer which are uncoated by phosphor; electrically non-conductive means isolating said phosphor particles; an electrically conductive liquid confined in said tube and means to move said liquid in response to a control signal.

6. The lamp of claim 5 wherein said phosphor particles are arranged in a pattern indicative of fixed increments.

7. An electroluminescent indicator comprising a hollow tubular member provided with a transparent wall; a transparent electrically conductive coating supported by said wall; a layer of electroluminescent phosphor particles affixed to said conductive layer; electrical insulating means coating said electroluminescent phosphor particles; electrically conductive liquid positioned in said tubular member; means for varying the level of liquid in said tubular member in response to an external signal; means to apply a voltage between said transparent electrically conductive coating and said electrically conductive liquid for exciting said phosphor particles; a resistance strip within said tubular member arranged so that the portion of said strip immersed in said conductive liquid varies proportionately with an increase in level of said liquid in said tube; an electric bridge circuit having a plurality of arms electrically connected to each other to form bridge input and output terminals, said resistance strip forming a variable arm of said bridge; means for applying a fixed potential across the said input terminals of said bridge; means for deriving an output signal from the said output terminals of said bridge; wherein said means for varying the level of said liquid in said tubular member is responsive to output signals from said bridge jointly with said external signal.

8. An electroluminescent indicator comprising a hollow tubular member provided with a transparent wall; a transparent electrically conductive coating supported by said wall; a layer of electroluminescent phosphor particles affixed to said conductive layer; electrical insulating means coating said electroluminescent phosphor particles; electrically non-conductive liquid positioned in said tubular member; means for varying the level of said liquid in said tubular member in response to an external signal; a quantity of electrically conductive liquid floating on said non-conductive liquid, an electrode arranged to contact said conductive liquid at all levels within said tubular member and means to apply a voltage between said transparent electrically conductive coating and said electrically conductive liquid for exciting said phosphor particles.

9. An electroluminescent indicator comprising a hollow tubular member provided with a transparent wall; a transparent electrically conductive coating supported by said wall; a layer of electroluminescent phosphor particles affixed to said conductive layer; electrical insulating means coating said electroluminescent phosphor particles; electrically conductive liquid positioned in said tubular member; means for varying the level of liquid in said tubular member in response to an external signal; means to apply a voltage between said transparent electrically conductive coating and said electrically conductive liquid for exciting said tubular member; a resistance strip positioned in said tubular member and arranged so that the portion of said strip immersed in said conductive liquid varies as the level of said liquid in said tube varies; and means connected to said resistance strip for providing an electrical signal indicative of the portion of the said resistance strip immersed in said conductive liquid.

10. The apparatus of claim 9 wherein said means for varying the level of said conductive liquid is under the joint control of said external signal and said electrical signal.

11. The apparatus of claim 10 wherein the said electrical signal is phased to buck said external signal.

References Cited in the file of this patent

UNITED STATES PATENTS

| 2,855,531 | Nicoll | Oct. 7, 1958 |
| 2,877,352 | Weigel et al. | Mar. 10, 1959 |

OTHER REFERENCES

The New Phenomenon of Electroluminescence and its Possibility for Investigation of Crystal Lattice, by Prof. G. Destriau, Philosophical Magazine, Ser. 7, vol. 38, No. 285, October 1947, pp. 712, 713.

UNITED STATES PATENT OFFICE
CERTIFICATE OF CORRECTION

Patent No. 3,038,097                                                June 5, 1962

Albert L. de Graffenried

It is hereby certified that error appears in the above numbered patent requiring correction and that the said Letters Patent should read as corrected below.

Column 1, line 24, for "provisions" read -- provision --; column 4, line 75, for "are" read -- arc --; column 5, line 30, for "bounded" read -- bonded --.

Signed and sealed this 1st day of January 1963.

(SEAL)
Attest:

ERNEST W. SWIDER                                            DAVID L. LADD
Attesting Officer                                                 Commissioner of Patents